US010727547B2

(12) United States Patent
Ho et al.

(10) Patent No.: US 10,727,547 B2
(45) Date of Patent: *Jul. 28, 2020

(54) METHOD FOR RECYCLING LITHIUM-ION BATTERY

(71) Applicant: GRST International Limited, Hong Kong (HK)

(72) Inventors: Kam Piu Ho, Hong Kong (HK); Ranshi Wang, Hong Kong (HK); Peihua Shen, Guangdong (CN)

(73) Assignee: GRST International Limited, Hong Kong (HK)

( * ) Notice: Subject to any disclaimer, the term of this patent is extended or adjusted under 35 U.S.C. 154(b) by 107 days.

This patent is subject to a terminal disclaimer.

(21) Appl. No.: 16/198,750

(22) Filed: Nov. 21, 2018

(65) Prior Publication Data

US 2019/0089025 A1    Mar. 21, 2019

Related U.S. Application Data

(62) Division of application No. 15/232,824, filed on Aug. 10, 2016, now Pat. No. 10,205,200.

(60) Provisional application No. 62/359,703, filed on Jul. 7, 2016.

(51) Int. Cl.
*H01M 10/54*   (2006.01)
*H01M 6/52*    (2006.01)
*H01M 10/0525* (2010.01)

(52) U.S. Cl.
CPC ............ *H01M 10/54* (2013.01); *H01M 6/52* (2013.01); *H01M 10/0525* (2013.01); *Y02P 10/21* (2015.11); *Y02P 70/54* (2015.11); *Y02W 30/84* (2015.05)

(58) Field of Classification Search
CPC ... H01M 6/52; H01M 10/54; Y10T 29/49751; Y10T 29/49755; Y02P 10/21–212; Y02P 70/54; Y02W 30/521; Y02W 30/523; Y02W 30/54
See application file for complete search history.

(56) References Cited

U.S. PATENT DOCUMENTS

| 6,447,669 B1 | 9/2002 | Lain |
| 6,474,575 B1 | 11/2002 | Gramling, III |
| 2010/0230518 A1 | 9/2010 | Ewles et al. |
| 2013/0034651 A1 | 2/2013 | Buqa et al. |
| 2013/0287654 A1 | 10/2013 | Yamada et al. |

(Continued)

FOREIGN PATENT DOCUMENTS

| CN | 1453897 A | 11/2003 |
| CN | 101570347 A | 11/2009 |

(Continued)

OTHER PUBLICATIONS

International Search Report of PCT Patent Application No. PCT/CN2017/087908 dated Aug. 23, 2017.

(Continued)

*Primary Examiner* — Matthew P Travers

(57) ABSTRACT

Provided herein is a method for recycling lithium-ion batteries in a polar solvent such as an aqueous media or water. The method disclosed herein isolates a mixture of anode and cathode materials from waste lithium-ion batteries. The separated electrode materials can easily be collected with high recovery rate, providing a rapid, efficient and low-cost method for recycling electrode materials from waste lithium-ion batteries.

18 Claims, 1 Drawing Sheet

(56) References Cited

U.S. PATENT DOCUMENTS

| | | |
|---|---|---|
| 2014/0227153 A1 | 8/2014 | Laucournet et al. |
| 2014/0264185 A1 | 9/2014 | Kim et al. |
| 2016/0043450 A1 | 2/2016 | Sloop |
| 2017/0207503 A1 | 7/2017 | Billy et al. |

FOREIGN PATENT DOCUMENTS

| | | |
|---|---|---|
| CN | 101847763 A | 9/2010 |
| CN | 101318712 B | 7/2011 |
| CN | 101916889 B | 5/2012 |
| CN | 102676827 A | 9/2012 |
| CN | 103449395 A | 12/2013 |
| CN | 104409792 A | 3/2015 |
| CN | 104577246 A | 4/2015 |
| CN | 104593606 A | 5/2015 |
| CN | 105355999 A | 2/2016 |
| JP | H0822846 A | 1/1996 |

OTHER PUBLICATIONS

Search Report of European Patent Application No. 17823499.3 dated Jul. 20, 2018.

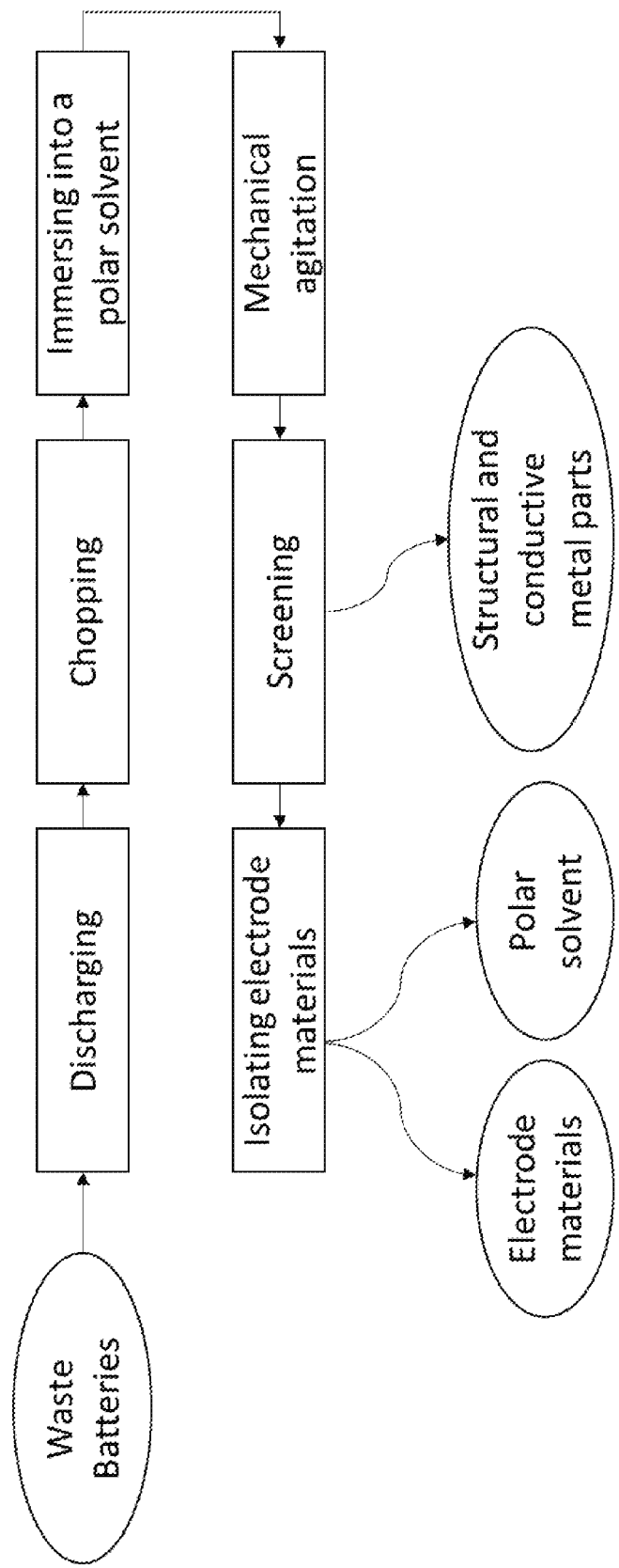

METHOD FOR RECYCLING LITHIUM-ION BATTERY

CROSS-REFERENCE TO RELATED APPLICATIONS

This application is a divisional of U.S. application Ser. No. 15/232,824, filed on Aug. 10, 2016, which claims the benefit of U.S. provisional application No. 62/359,703, filed on Jul. 7, 2016, both of which are incorporated herein by reference in their entireties.

FIELD OF THE INVENTION

This invention relates to methods of recycling lithium-ion batteries.

BACKGROUND OF THE INVENTION

In the past decades, lithium-ion batteries (LIBs) have been widely utilized in various applications such as consumer electronics because of their superior energy density, long life type and discharging capability. LIB s generally include an anode, an electrolyte, and a cathode that contains lithium in the form of a lithium-transition metal oxide.

In recent years, LIBs have been used in significant quantities for automotive propulsion because these batteries can provide many years of reliable service and are expected to last for about 10 years under normal driving conditions. LIBs may subsequently be used for utility energy storage and are eventually considered to have reached the end of their useful life.

Environmental issues of spent LIBs have attracted widespread concern in the public. If usable materials can be recovered from used batteries, less raw materials need to be extracted from the limited supplies in the ground. In addition, significant negative environmental impacts caused by mining and processing ores (e.g., $SO_x$ emissions from smelting of sulfide ores, such as those that yield copper, nickel, and cobalt) are avoided if the used LIBs can be recycled.

Currently, methods for recycling waste LIB s can be divided into two broad types: leaching method, and combination method of calcination and leaching. Generally, leaching method includes steps of crushing or chopping battery, leaching with acid, separating the leached materials by precipitation, complexation and/or extraction. However, leaching involves complex leachate composition and multiple separation steps creating large amounts of secondary waste.

Combination method of calcination and leaching includes steps of crushing or chopping battery, calcinating, leaching with acid, separating the leached materials, etc. However, this method has the additional disadvantage of high energy consumption caused by the heat treating process. Besides, recovery rate of the electrode materials is low since some components of the electrode materials are burned into carbon dioxide and other harmful substances.

Different attempts have been made to solve the problems and improve the performance of the recycling process. CN Patent Publication No. 104577246 A describes a method of recycling cathode and anode materials from LIBs. However, the method is time-consuming and labor-intensive since the recycling method requires removal of battery shell.

CN Patent Publication No. 103449395 A discloses a method for recycling a cathode material from lithium iron phosphate batteries. However, the method requires a step of meticulously disassembling lithium iron phosphate batteries to obtain undamaged cathode plates and is limited to lithium iron phosphate batteries.

CN Patent No. 101318712 B discloses a method for recovering cobalt from LIB s. However, the recycled content is only limited to $LiCoO_2$, and not applicable to other cathode materials.

CN Patent Publication No. 104409792 A discloses a method for recovering cobalt from LIBs. The method comprises a step of separating materials of different densities based on a sink-float method where a heavier fraction sinks to the bottom, and a lighter fraction floats. This separation system although conceptually very simple suffers from a number of drawbacks. When the solid material is wetted with water or an aqueous liquor, some of the light and heavy particles flocculate to form aggregates. It is, therefore, a part of the suspended solid particles containing $LiCoO_2$ and carbon powder will settle and be removed when separating the heavier fraction, thereby complicating the separation process. In addition, the method is time consuming and not economical since the lighter fraction, heavier fraction, and suspended solid particles must be removed sequentially. Furthermore, the recycled content is also limited to $LiCoO_2$, and not applicable to other cathode materials.

In view of the above, there is always a need to develop a method for recycling LIBs with high recovery, high efficiency and low cost under mild conditions. In particular, a non-polluting method for recycling LIBs is needed to reduce air and water pollution formed in the recycling process.

SUMMARY OF THE INVENTION

The aforementioned needs are met by various aspects and embodiments disclosed herein. In one aspect, provided herein is a method for recycling lithium-ion batteries, comprising the steps of:
  a) discharging the lithium-ion batteries;
  b) chopping the lithium-ion batteries into pieces to provide a mixture of structural part, a first conductive metal part coated with a cathode layer, and a second conductive metal part coated with an anode layer;
  c) immersing the pieces of the chopped lithium ion batteries into a polar solvent to form a heterogeneous mixture;
  d) processing the heterogeneous mixture with mechanical agitation for a time period from about 15 minutes to about 10 hours to dissolve a binder material;
  e) screening the processed heterogeneous mixture to separate the structural part, first conductive metal part, and second conductive metal part from finer electrode materials comprising cathode and anode materials to provide a suspension comprising the polar solvent and the finer electrode materials; and
  f) isolating the finer electrode materials in the suspension from the polar solvent.

In some embodiments, the lithium-ion batteries are chopped by a water jet cutting machine or a cutting device with teeth or blades. In certain embodiments, the pieces of the chopped lithium-ion batteries have an average length from about 0.5 inches to about 4.0 inches. In other embodiments, the pieces of the chopped lithium-ion batteries have an average length of about one quarter inch or less.

In certain embodiments, each of the first and second conductive metal parts is independently selected from the group consisting of an aluminum thin plate, a copper thin plate, a gold thin plate, a silver thin plate, and a platinum thin plate.

In some embodiments, the polar solvent is water. In other embodiments, the polar solvent is a mixture of water and an alcohol. In further embodiments, the alcohol is selected from methanol, ethanol, isopropanol, n-propanol, t-butanol, or a combination thereof. In still further embodiments, a weight ratio of water to the alcohol is from about 5:95 to about 95:5.

In certain embodiments, the polar solvent is a mixture of water and ketone. In further embodiments, the ketone is selected from acetone, diethyl ketone, methyl ethyl ketone, methyl isobutyl ketone and methyl propyl ketone, or a combination thereof. In still further embodiments, a weight ratio of water to the ketone is from about 5:95 to about 95:5.

In some embodiments, the polar solvent is a buffer solution comprising a salt selected from the group consisting of lithium carbonate, lithium bicarbonate, lithium phosphate, sodium carbonate, sodium bicarbonate, sodium phosphate, potassium carbonate, potassium bicarbonate, potassium phosphate, ammonium carbonate, ammonium bicarbonate, ammonium phosphate, and combinations thereof. In certain embodiments, the buffer solution has a pH from about 6 to about 8.

In certain embodiments, the mechanical agitation of the processing step is performed by stirring, shaking, ultrasonication, vortexing, or a combination thereof.

In some embodiments, the heterogeneous mixture in step d) is heated at a temperature from about 35° C. to about 100° C. In some embodiments, the heterogeneous mixture in step d) is heated at a temperature from about 55° C. to about 75° C.

In certain embodiments, the binder material is or comprises a water-based binder material, or a mixture of water-based and organic-based binder materials.

In some embodiments, the water-based binder material is selected from the group consisting of styrene-butadiene rubber, acrylated styrene-butadiene rubber, acrylonitrile-butadiene rubber, nitrile butadiene rubber, acrylonitrile-styrene-butadiene copolymer, acryl rubber, butyl rubber, fluorine rubber, polytetrafluoroethylene, polyethylene, polypropylene, ethylene/propylene copolymers, polybutadiene, polyethylene oxide, chlorosulfonated polyethylene, polyvinylpyrrolidone, polyvinylpyridine, polyvinyl alcohol, polyvinyl acetate, polyepichlorohydrin, polyphosphazene, polyacrylonitrile, polystyrene, latex, acrylic resins, phenolic resins, epoxy resins, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, fluorinated polymer, chlorinated polymer, a salt of alginic acid, and combinations thereof.

In certain embodiments, the organic-based binder material is selected from the group consisting of polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, terpolymer of tetrafluoroethylene, hexafluoropropylene and vinylidene fluoride, and combinations thereof.

In some embodiments, the finer electrode materials further comprise a conductive agent.

In certain embodiments, the cathode material is a lithium metal oxide. In further embodiments, the lithium metal oxide is selected from the group consisting of $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCoO_2$, $LiCrO_2$, $LiMn_2O_4$, $LiFePO_4$, and combinations thereof, wherein each x is independently from 0.3 to 0.8; each y is independently from 0.1 to 0.45; and each z is independently from 0 to 0.2.

In some embodiments, the anode material is a carbonaceous material.

In certain embodiments, the finer electrode materials are screened by passing through a sieve having a mesh width between 2 mm and 4 mm. In certain embodiments, the finer electrode materials are screened by passing through a sieve having a mesh width between 0.5 mm and 1.0 mm.

In some embodiments, isolation of the finer electrode materials is performed by filtration, decanting, settling, centrifugation, or a combination thereof.

BRIEF DESCRIPTION OF THE DRAWINGS

The figure depicts an embodiment of the method disclosed herein.

DETAILED DESCRIPTION OF THE INVENTION

General Definitions

The term "mechanical agitation" refers to the application of kinetic energy to a solid mixture in contact with a liquid in order to facilitate wetting of the solid mixture within the liquid. Some non-limiting examples of the mechanical agitation include mixing, stirring, shaking, ultrasonication, vortexing, and combinations thereof.

The term "water jet cutting machine" or "water jet cutter" refers to a tool capable of cutting a wide variety of materials using a very high-pressure jet of water.

The term "cutting device" refers to an apparatus that comprises an electric motor and a movable cutting member that is caused to move by output from the motor. Any cutting device that can be used to chop the lithium-ion batteries into pieces can be used herein. In some embodiments, the movable cutting member comprises at least one blade which is an elongated flat body and is movable up and down and comprises a lower side to carry out a cutting operation. In further embodiments, the at least one blade comprises a row of cutting teeth along the lower side of the blade. In certain embodiments, the movable cutting member comprises at least one circular saw blade which is rotatable. In further embodiments, the at least one circular saw blade comprises a rim and a plurality of cutting teeth extending outwardly from the rim.

The term "heterogeneous mixture" refers to a mixture of two or more phases.

The term "electrode" refers to a "cathode" or an "anode."

The term "positive electrode" is used interchangeably with cathode. Likewise, the term "negative electrode" is used interchangeably with anode.

The term "binder material" refers to a chemical or a substance used to hold an electrode material and/or a conductive agent in place and adhere them onto a conductive metal part to form an electrode. In some embodiments, the electrode does not comprise any conductive agent.

The term "water-based binder material" refers to a water-soluble or water-dispersible binder polymer. Some non-limiting examples of the water-based binder material include styrene-butadiene rubber, acrylated styrene-butadiene rubber, acrylonitrile-butadiene rubber, acryl rubber, butyl rubber, fluorine rubber, polytetrafluoroethylene, polyethylene, polypropylene, ethylene/propylene copolymers, polybutadiene, butyl rubber, fluorine rubber, polyethylene oxide, polyvinylpyrrolidone, polyepichlorohydrin, polyphosphazene, polyacrylonitrile, polystyrene, ethylene/propylene/diene copolymers, polyvinylpyridine, chlorosulfonated polyethylene, latex, polyester resins, acrylic resins, phenolic resins, epoxy resins, polyvinyl alcohol, carboxymethyl cellulose, hydroxypropyl cellulose, and combinations thereof.

The term "organic-based binder material" refers to a binder dissolved or dispersed in an organic solvent, in particular, N-methyl pyrrolidone (NMP). Some non-limiting examples of the organic-based binder material include polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, and terpolymer of tetrafluoroethylene, hexafluoropropylene and vinylidene fluoride, and combinations thereof.

The term "conductive metal part" refers to a support for coating an electrode material and/or a conductive agent. Some non-limiting examples of the conductive metal part include an aluminum thin plate, a copper thin plate, a gold thin plate, a silver thin plate, and a platinum thin plate.

The term "conductive agent" refers to a material which is chemically inactive and has good electrical conductivity. Therefore, the conductive agent is often mixed with an electrode active material at the time of forming an electrode to improve electrical conductivity of the electrode. In some embodiments, the conductive agent is a carbonaceous material.

The term "carbonaceous material" refers to any material that includes at least 50 mole % carbon. Some non-limiting examples of the carbonaceous material include soft carbon, hard carbon, coke, graphite, carbon nanotubes, carbon fibers, graphite fibers, carbon nanofibers, graphite nanofibers, carbon black, activated carbon, and combinations thereof.

The term "ultrasonicator" refers to an equipment that can apply ultrasound energy to assist solubilization and/or dissolution of the binder material in a mixture. Any ultrasonicator that can be used to assist solubilization and/or dissolution of the binder material in the mixture can be used herein. Some non-limiting examples of the ultrasonicator include an ultrasonic bath and a probe-type ultrasonicator.

The term "solubilization" used herein refers to an act of rendering a hydrophobic substance soluble or more soluble in aqueous environments.

The term "ultrasonic bath" refers to an apparatus through which the ultrasonic energy is transmitted via the container's wall of the ultrasonic bath into the liquid sample.

The term "probe-type ultrasonicator" refers to an ultrasonic probe immersed into a medium for direct sonication. The term "direct sonication" means that the ultrasound is directly coupled into the processing liquid.

The term "room temperature" refers to a temperature from about 18° C. to about 30° C., e.g., 18, 19, 20, 21, 22, 23, 24, 25, 26, 27, 28, 29, or 30 ° C. In some embodiments, room temperature refers to a temperature of about 20° C. +/− 1° C. or +/− 2° C. or +/− 3° C. In other embodiments, room temperature refers to a temperature of about 22 ° C. or about 25° C.

The term "major component" of a composition refers to the component that is more than 50%, more than 55%, more than 60%, more than 65%, more than 70%, more than 75%, more than 80%, more than 85%, more than 90%, or more than 95% by weight or volume, based on the total weight or volume of the composition.

The term "minor component" of a composition refers to the component that is less than 50%, less than 45%, less than 40%, less than 35%, less than 30%, less than 25%, less than 20%, less than 15%, less than 10%, or less than 5% by weight or volume, based on the total weight or volume of the composition.

The term "C rate" refers to the charging or discharging rate of a cell or battery, expressed in terms of its total storage capacity in Ah or mAh. For example, a rate of 1 C means utilization of all of the stored energy in one hour; a 0.1 C means utilization of 10% of the energy in one hour and the full energy in 10 hours; and a 5 C means utilization of the full energy in 12 minutes.

The term "ampere-hour (Ah)" refers to a unit used in specifying the storage capacity of a battery. For example, a battery with 1 Ah capacity can supply a current of one ampere for one hour or 0.5 A for two hours, etc. Therefore, 1 Ampere-hour (Ah) is the equivalent of 3600 coulombs of electrical charge. Similarly, the term "miniampere-hour (mAh)" also refers to a unit of the storage capacity of a battery and is $1/1,000$ of an ampere-hour.

In the following description, all numbers disclosed herein are approximate values, regardless whether the word "about" or "approximate" is used in connection therewith. They may vary by 1 percent, 2 percent, 5 percent, or, sometimes, 10 to 20 percent. Whenever a numerical range with a lower limit, $R^L$, and an upper limit, $R^U$, is disclosed, any number falling within the range is specifically disclosed. In particular, the following numbers within the range are specifically disclosed: , $R=R^L+k*(R_U-R^L)$, wherein k is a variable ranging from 1 percent to 100 percent with a 1 percent increment, i.e., k is 1 percent, 2 percent, 3 percent, 4 percent, 5 percent, . . . , 50 percent, 51 percent, 52 percent, . . . , 95 percent, 96 percent, 97 percent, 98 percent, 99 percent, or 100 percent. Moreover, any numerical range defined by two R numbers as defined in the above is also specifically disclosed.

Provided herein is a method for recycling lithium-ion batteries, comprising the steps of:
  a) discharging the lithium-ion batteries;
  b) chopping the lithium-ion batteries into pieces to provide a mixture of a structural part, a first conductive metal part coated with a cathode layer, and a second conductive metal part coated with an anode layer;
  c) immersing the pieces of the chopped li -ion batteries into a pola solvent to form a heterogeneous mixture;
  d) processing the heterogeneous mixture with mechanical agitation for a time period from about 15 minutes to about 10 hours to dissolve a binder material;
  e) screening the processed heterogeneous mixture to separate the structural part, first conductive metal part, and second conductive metal part from finer electrode materials comprising cathode and anode materials to provide a suspension comprising the polar solvent and the finer electrode materials; and
  f) isolating the finer electrode materials in the suspension from the polar solvent.

The present invention is intended to overcome the disadvantages of conventional recovery methods, to provide methods for recycling lithium-ion batteries having higher efficiency, low cost, and ease of handling. According to the present invention, a method for recycling lithium-ion batteries in a simple and easy manner with high efficiency can be provided.

The figure is a flowchart illustrating an embodiment of a recycling process of used lithium-ion batteries. The present invention simplifies the recycling process of spent lithium-ion batteries and reduces the operating cost.

Before recycling, lithium-ion batteries are discharged because charge may remain stored in the batteries. In some embodiments, the charge remaining stored in the batteries is discharged by soaking the batteries in an aqueous solution containing a conducting salt. In certain embodiments, the aqueous solution is neutral or alkaline. The discharge provides an advantage capable of ensuring the safety.

In some embodiments, the conducting salt is or comprises an alkali metal bicarbonate, such as sodium bicarbonate ($NaHCO_3$) and potassium bicarbonate ($KHCO_3$), an alkali metal carbonate, such as sodium carbonate ($Na_2CO_3$) and potassium carbonate ($K_2CO_3$), an alkaline earth metal carbonates, such as calcium carbonate ($CaCO_3$) and magnesium carbonate ($MgCO_3$), an alkali metal hydroxide, such as sodium hydroxide (NaOH) and potassium hydroxide (KOH), an alkaline earth metal hydroxides, such as calcium hydroxide ($Ca(OH)_2$), magnesium hydroxide ($Mg(OH)_2$), or an alkali metal or alkaline earth metal halides, such as sodium chloride (NaCl) and calcium chloride ($CaCl_2$), or a combination thereof.

Electric resistance of the aqueous solution can be regulated. A too small resistance of the solution leads to a risk of discharging too rapidly. On the other hand, a too large resistance will make the discharging time too long. In certain embodiments, the solution resistance can fall within a range from about 0.1Ω to about 10 kΩ by regulating the concentration of the aqueous solution.

In certain embodiments, a total molar concentration of the conducting salt in the aqueous solution is from about 1 mol/L to about 5 mol/L, from about 1.0 mol/L to about 4 mol/L, from about 1 mol/L to about 3 mol/L, from about 2 mol/L to about 5 mol/L, from about 2 mol/L to about 4 mol/L, from about 2 mol/L to about 3 mol/L, or from about 4 mol/L to about 5 mol/L. Within this range, safe and controlled discharge of the batteries can be achieved. In other embodiments, the aqueous solution for discharging does not comprise any conducting salt.

In some embodiments, the batteries can be punctured before soaking in the aqueous solution. Punctured hole can be formed by impact puncturing, saw blade cutting, or any other means of mechanically piercing the battery pack shell and housing.

The discharged batteries are then chopped into pieces to provide a mixture of a structural part, a first conductive metal part coated with a cathode layer, and a second conductive metal part coated with an anode layer.

In certain embodiments, the lithium-ion batteries are chopped by a water jet cutting machine or a cutting device with teeth or blades. The operation of the cutting machine may be monitored by a computer and the speed of the cutting machine may thereby be automatically adjusted to ensure that the resulting battery pieces are of the desired size.

A cathode for a lithium secondary battery may have a structure in which a cathode layer is formed on a first conductive metal part. An anode for a lithium secondary battery may have a structure in which an anode layer is formed on a second conductive metal part. The conductive metal part serves as a current collector. Any metal having excellent electron conductivity as to operate as the current collector may be used herein.

In some embodiments, each of the first and second conductive metal parts is independently selected from the group consisting of an aluminum thin plate, a copper thin plate, a gold thin plate, a silver thin plate, and a platinum thin plate. In certain embodiments, the first conductive metal part is an aluminum thin plate. In some embodiments, the second conductive metal part is a copper thin plate.

Each battery is cut by the cutting machine into smaller pieces. In certain embodiments, the pieces of the chopped lithium-ion batteries have an average length from about 0.5 inches to about 4.0 inches. In some embodiments, the pieces of the chopped lithium-ion batteries have an average length of about one quarter inch or less.

The method disclosed herein does not involve a dismantling step. Therefore, a large quantity of work can be processed without dismantlement.

One of the biggest challenges to recycling is that the recycling process itself creates even more toxic chemicals due to the use of many toxic and volatile organic solvents, contributing to pollution. Consequently, it is highly desirable to develop environmentally benign recycling processes that can be conducted in aqueous media or water. Furthermore, using aqueous media or water as a solvent offers many advantages, such as simple operation.

The recycling method disclosed herein is non-toxic and environmentally friendly. The pieces of the chopped lithium-ion batteries are then immersed into a polar solvent to form a heterogeneous mixture. The polar solvent can be any solvent having a relative permittivity (aka dielectric constant) greater than 10. In some embodiments, the polar solvent has a relative permittivity greater than 15, 20, 25 or 30.

In some embodiments, the polar solvent is a solution containing water as the major component and a volatile solvent, such as alcohols, lower aliphatic ketones, lower alkyl acetates or the like, as the minor component in addition to water. In certain embodiments, the amount of water is at least 50%, at least 55%, at least 60%, at least 65%, at least 70%, at least 75%, at least 80%, at least 85%, at least 90%, or at least 95% to the total amount of water and solvents other than water. In some embodiments, the amount of water is at most 55%, at most 60%, at most 65%, at most 70%, at most 75%, at most 80%, at most 85%, at most 90%, or at most 95% to the total amount of water and solvents other than water. In some embodiments, the polar solvent consists solely of water, that is, the proportion of water in the polar solvent is 100 vol. %.

Any water-miscible solvents can be used as the minor component. Some non-limiting examples of the minor component (i.e., solvents other than water) include alcohols, lower aliphatic ketones, lower alkyl acetates and combinations thereof. Some non-limiting examples of the alcohol include $C_2$-$C_4$ alcohols, such as methanol, ethanol, isopropanol, n-propanol, butanol, and combinations thereof. In some embodiments, the minor component has a relative permittivity greater than 10, 15, 20, 25 or 30. Some non-limiting examples of the lower aliphatic ketones include acetone, dimethyl ketone, and methyl ethyl ketone. Some non-limiting examples of the lower alkyl acetates include ethyl acetate, isopropyl acetate, and propyl acetate.

In some embodiments, the volatile solvent or the minor component is methyl ethyl ketone, ethanol, ethyl acetate, or a combination thereof.

In certain embodiments, a weight ratio of water to the alcohol is from about 99:1 to about 1:99, from about 95:5 to about 5:95, from about 10:1 to about 1:10, from about 10:1 to about 1:1, from about 8:1 to about 3:1, from about 5:1 to about 3:1, from about 4:1 to about 2:1, or from about 3:1 to about 1:3. In some embodiments, the weight ratio of water to the alcohol is about 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1.

In some embodiments, the polar solvent is a mixture of water and ketone. In further embodiments, the ketone is selected from acetone, diethyl ketone, methyl ethyl ketone, methyl isobutyl ketone, methyl propyl ketone, or a combination thereof. In still further embodiments, a weight ratio of water to the ketone is from about 5:95 to about 95:5. In certain embodiments, the weight ratio of water to the ketone is about 1:10, 1:9, 1:8, 1:7, 1:6, 1:5, 1:4, 1:3, 1:2, 1:1, 2:1, 3:1, 4:1, 5:1, 6:1, 7:1, 8:1, 9:1, or 10:1.

In certain embodiments, the polar solvent used for immersing the pieces of the chopped lithium-ion batteries is water. Some non-limiting examples of water include tap water, bottled water, purified water, pure water, distilled water, de-ionized water, $D_2O$, or a combination thereof. In some embodiments, the polar solvent is de-ionized water. In some embodiments, the polar solvent is free of alcohol, aliphatic ketone, alkyl acetate, or a combination thereof. In certain embodiments, the polar solvent is free of a minor component having a relative permittivity greater than 10, 15, 20, 25 or 30. In some embodiments, the polar solvent is free of a minor component having a relative permittivity smaller than 20, 25, 30, 35, 40, 45, 50, 55 or 60.

In some embodiments, the polar solvent is a buffer solution comprising a salt selected from the group consisting of lithium carbonate, lithium bicarbonate, lithium phosphate, sodium carbonate, sodium bicarbonate, sodium phosphate, potassium carbonate, potassium bicarbonate, potassium phosphate, ammonium carbonate, ammonium bicarbonate, ammonium phosphate, and combinations thereof. In certain embodiments, the buffer solution has a pH from about 6 to about 8. In some embodiments, the pH of the buffer solution is about 8.5, about 8.0, about 7.5, about 7.0, about 6.5, about 6.0, or about 5.5. In other embodiments, the pH of the buffer solution is less than about 8, less than about 7.5, less than about 7, less than about 6.5, or less than about 6.

In certain embodiments, the heterogeneous mixture is processed to assist dissolution of binder material under mechanical agitation. Any suitable method may be used to agitate the heterogeneous mixture. Some non-limiting examples of suitable agitation may be accomplished by mechanical stirring, magnetic stirring, shaking, ultrasonication, vortexing, and combinations thereof.

In some embodiments, the heterogeneous mixture can be mechanically stirred. In certain embodiments, the heterogeneous mixture can be ultrasonically agitated.

The main advantage of using mechanical stirring is that it allows reliable scale-up from lab scale to pilot or large scale. Other advantages of mechanical stirring are the simple mechanical construction, simple maintenance and lower operating costs, particularly reduced energy and cooling water costs, as the use of mechanical stirring would diminish the cooling water requirements.

An advantage of ultrasonic agitation is that it reduces the processing time. However, during scale-up, problem is mainly concerned with poor transmission of the ultrasound. The amplitude of sonication should be increased when working with large amount of samples. This is because as the amount of sample increases so does the resistance of the sample to the movement of the ultrasound wave. Therefore, a high amplitude (i.e., high intensity) is needed so as to obtain the necessary mechanical vibration.

However, the high amplitude of sonication can lead to rapid deterioration of ultrasonic transducer, resulting in poor transmission of the ultrasound through the liquid media. This problem becomes more severe when a larger container is used. On the other hand, the investment costs of ultrasonic equipment for large-scale operations are high and the energy costs are also higher than in mechanically-stirred processing.

In some embodiments, the mechanical agitation can be performed for a time period sufficient for detaching electrode materials from conductive metal parts. In certain embodiments, the time period is from about 15 minutes to about 10 hours, from about 15 minutes to about 8 hours, from about 15 minutes to about 6 hours, from about 15 minutes to about 4 hours, from about 15 minutes to about 2 hours, from about 15 minutes to about 1 hour, from about 30 minutes to about 4 hours, from about 30 minutes to about 2 hours, from about 30 minutes to about 1 hour, or from about 1 hour to about 2 hours.

Generally, when the agitation time is less than 15 minutes, the dissolution amount of binder material is small and relatively large amount of electrode materials still adheres to conductive metal parts. This eventually decreases the amount of electrode materials recovered. This is particularly true when scaling up the recovery of LIBs.

Any temperature that can be used to process the heterogeneous mixture with mechanical agitation can be used herein. In some embodiments, the binder material is water-based and soluble in cold water. In certain embodiments, the processing temperature is about 14° C., about 16° C., about 18° C., about 20° C., about 22° C., about 24° C., or about 26° C. In certain embodiments, the mechanical agitation can be performed at room temperature. In some embodiments, the mechanical agitation can be performed at a temperature below 30 ° C., below 25° C., below 22° C., below 20° C., below 15° C., or below 10° C. After processing the heterogeneous mixture, the cathode and anode layers are separated from the conductive metal parts and particles of the electrode materials are fallen off the electrode layers.

The separation efficiency can be increased by elevated temperatures. In certain embodiments, the mechanical agitation can be performed with heating at a temperature from about 35° C. to about 100° C., from about 35° C. to about 80° C., from about 35° C. to about 60° C., from about 35° C. to about 50° C., from about 55° C. to about 100° C., from about 55° C. to about 75° C., or from about 55° C. to about 65° C. After heat treatment, due to thermal expansion difference between the cathode and anode layers and the conductive metal parts, the cathode and anode layers may be easily separated from the conductive metal parts.

In some embodiments, the binder material is a mixture of water-based and organic-based binder materials. US Patent Publication No. 20130034651 A1 discloses that the organic-based binder material such as PVDF can be used in a water-based slurry for the manufacture of battery electrodes when the slurry comprises a combination of PVDF and other water-based binder materials. It has been found that the method disclosed herein is also applicable to this binder system and the cathode and anode layers can be separated from the conductive metal parts.

However, it is difficult to dissolve pure organic-based binders because of their low solubility in water. In this case, the adhesive strength between the cathode and anode layers and the conductive metal parts remains strong, and therefore the cathode and anode layers are less likely to be separated from the conductive metal parts.

In some embodiments, the mechanical agitation is performed by an ultrasonicator. Any ultrasonicator that can apply ultrasound energy to assist solubilization and/or dissolution of the binder material in a mixture can be used herein. In some embodiments, the ultrasonicator is a probe-type ultrasonicator or an ultrasonic bath.

In certain embodiments, the ultrasonicator is operated at a power density from about 10 W/L to about 100 W/L, from about 40 W/L to about 60 W/L, from about 20 W/L to about 100 W/L, from about 30 W/L to about 100 W/L, from about 40 W/L to about 80 W/L, from about 40 W/L to about 70 W/L, from about 40 W/L to about 50 W/L, or from about 50 W/L to about 60 W/L.

A positive electrode includes a cathode layer supported on a first conductive metal part. Typically, the first conductive metal part is an aluminum or other metallic/conductive foil substrate. The cathode layer contains at least a cathode material and a binder material. The cathode layer may further comprise a conductive agent for enhancing electron conductivity of the cathode layer. The positive electrode may include a significant amount of a binder material such as polymeric binder and the binder material is used to bind the cathode material to the first conductive metal part.

A negative electrode includes an anode layer supported on a second conductive metal part. Typically, the second conductive metal part is a copper or other metallic/conductive foil substrate. The anode layer contains at least an anode material and a binder material. The anode layer may further comprise a conductive agent for enhancing electron conductivity of the anode layer. The negative electrode may include a significant amount of a binder material for binding the anode material to the second conductive metal part.

In some embodiments, the binder material is or comprises a water-based binder material, or a mixture of water-based and organic-based binder materials.

In certain embodiments, the water-based binder material is selected from the group consisting of unsaturated polymer, conjugated diene polymer, styrene-butadiene rubber, acrylated styrene-butadiene rubber, acrylonitrile-butadiene rubber, nitrile butadiene rubber, acrylonitrile-styrene-butadiene copolymer, rubber, acryl rubber, butyl rubber, fluorine rubber, polytetrafluoroethylene, polyolefin, polyethylene, polypropylene, ethylene/propylene copolymers, polybutadiene, polyethylene oxide, chlorosulfonated polyethylene, polyvinylpyrrolidone, polyvinylpyridine, polyvinyl compound, polyvinyl alcohol, polyvinyl acetate, polyepichlorohydrin, polyphosphazene, polyacrylonitrile, polystyrene, latex, acrylic resins, phenolic resins, epoxy resins, cellulose, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, halogenated polymer, fluorinated polymer, chlorinated polymer, a salt of alginic acid, and combinations thereof.

Some non-limiting examples of the polyvinyl compound include those that consist of N-vinylamide monomers such as N-vinyl formamide and N-vinyl acetamide or that contain these monomers. The poly-N-vinyl compound is characterized by good wettability. Homopolymers, copolymers, and block copolymers can also be used herein. In some embodiments, the polyvinyl compound is a random, block or alternating interpolymer. In further embodiments, the polyvinyl compound is a di-block, tri-block or other multi-block interpolymer.

Some non-limiting examples of the rubber include natural rubber, isoprene rubber, butadiene rubber, chloroprene rubber, styrene butadiene rubber, and nitrile butadiene rubber. These rubbers contain unsaturated double bonds. In some embodiments, the rubber is a random, block or alternating interpolymer. In further embodiments, the rubber is a di-block, tri-block or other multi-block interpolymer. Unsaturated polymers are generally characterized by good adhesive properties.

In certain embodiments, the salt of alginic acid comprises a cation selected from Na, Li, K, Ca, $NH_4$, Mg, Al, or a combination thereof.

In some embodiments, the water-based binder material is a monomer containing a carboxylic acid group, a sulfonic acid group, or a combination thereof.

Some non-limiting examples of the monomer having a carboxylic acid group include monocarboxylic acid, dicarboxylic acid, anhydride of dicarboxylic acid, and derivatives thereof. Some non-limiting examples of the monocarboxylic acid include acrylic acid, methacrylic acid, crotonic acid, 2-ethylacrylic acid, and isocrotonic acid. Some non-limiting examples of the dicarboxylic acid include maleic acid, fumaric acid, itaconic acid, and methyl maleic acid. Some non-limiting examples of the anhydride of dicarboxylic acid include maleic anhydride, acrylic anhydride, methyl maleic anhydride, and dimethyl maleic anhydride.

Some non-limiting examples of the monomer having a sulfonic acid group include vinylsulfonic acid, methyl vinylsulfonic acid, (meth)allylsulfonic acid, styrenesulfonic acid, (meth)acrylic acid-2-ethyl sulfonate, 2-acrylamide-2-methylpropanesulfonic acid, 3-allyloxy-2-hydroxypropanesulfonic acid, and 2-(N-acryloyl)amino-2-methyl-1,3-propanedisulfonic acid.

In some embodiments, the organic-based binder material is selected from the group consisting of polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, terpolymer of tetrafluoroethylene, hexafluoropropylene and vinylidene fluoride, and combinations thereof. In certain embodiments, the organic-based binder material is PVDF. In some embodiments, the electrodes disclosed herein are free of organic-based binder material. In certain embodiments, the binder material is free of polytetrafluoroethylene (PTFE), perfluoroalkoxy polymer (PFA), polyvinylidene fluoride (PVDF), copolymer of tetrafluoroethylene (TFE) and hexafluoropropylene (HFP), fluorinated ethylene-propylene (FEP) copolymer, terpolymer of tetrafluoroethylene, hexafluoropropylene and vinylidene fluoride.

After dissolution of the binder material, the processed heterogeneous mixture is screened to separate the structural part, first conductive metal part, and second conductive metal part from finer electrode materials comprising cathode and anode materials to provide a suspension comprising the polar solvent and the finer electrode materials.

In certain embodiments, the finer electrode materials are screened by passing through a sieve having a mesh width between 2 mm and 4 mm. In some embodiments, the finer electrode materials are screened by passing through a sieve having a mesh width between 0.5 mm and 1.0 mm.

In some embodiments, the finer electrode materials further comprise a conductive agent. In this case, the suspension comprises the polar solvent and the finer electrode materials containing the anode and cathode materials and conductive agent.

In certain embodiments, the cathode material is a lithium metal oxide. In further embodiments, the lithium metal oxide is selected from the group consisting of $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCoO_2$, $LiCrO_2$, $LiMn_2O_4$, $LiFePO_4$, and combinations thereof, wherein each x is independently from 0.3 to 0.8; each y is independently from 0.1 to 0.45; and each z is independently from 0 to 0.2. In certain embodiments, the cathode material is selected from the group consisting of $LiCO_2$, $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCrO_2$, $LiMn_2O_4$, $LiFeO_2$, $LiFePO_4$, and combinations thereof, wherein each x is independently from 0.4 to 0.6; each y is independently from 0.2 to 0.4; and each z is independently from 0 to 0.1. In other embodiments, the cathode material is not $LiCO_2$, $LiNiO_2$, $LiV_2O_5$, $LiTiS_2$, $LiMoS_2$, $LiMnO_2$, $LiCrO_2$, $LiMn_2O_4$, $LiFeO_2$, or $LiFePO_4$. In further embodiments, the cathode material is not $LiNi_xMn_yO_2$, $Li_{1+z}Ni_xMn_yCo_{1-x-y}O_2$, or $LiNi_xCo_yAl_zO_2$, wherein each x is independently from 0.3 to 0.8; each y is independently from 0.1 to 0.45; and each z is independently from 0 to 0.2. In still further embodiments, the cathode material is not $LiCO_2$ and $LiFePO_4$.

In some embodiments, the lithium metal oxide may include NMC ($Li_{1+z}Ni_xMn_yCo_{1-x-y}O_2$) with various ratios of Ni:Mn:Co, for example, 1:1:1; 5:3:2; 4:4:2; 8:1:1.

In certain embodiments, the anode material is selected from the group consisting of natural graphite particulate, synthetic graphite particulate, Sn (tin) particulate, $Li_4Ti_5O_{12}$ particulate, Si (silicon) particulate, Si—C composite particulate, and combinations thereof. In other embodiments, the anode material is not natural graphite particulate, synthetic graphite particulate, Sn (tin) particulate, $Li_4Ti_5O_{12}$ particulate, Si (silicon) particulate, or Si—C composite particulate.

In some embodiments, the conductive agent is a carbonaceous material. In certain embodiments, the carbonaceous material is soft carbon, hard carbon, coke, graphite, carbon nanotubes, carbon fibers, graphite fibers, carbon nanofibers, graphite nanofibers, carbon black, activated carbon, or a combination thereof. In certain embodiments, the conductive agent is not soft carbon, hard carbon, coke, graphite, carbon nanotubes, carbon fibers, graphite fibers, carbon nanofibers, graphite nanofibers, carbon black, or activated carbon.

After the screening step, the finer electrode materials in the suspension are isolated from the polar solvent. The cathode material and the anode material can be recycled simultaneously, thereby simplifying the recycling method. The isolated electrode materials can easily be collected and the recycling rate of the electrode materials is high.

Isolation of the finer electrode materials can be accomplished by a variety of methods known in the art including, but not limited to, filtration, decantation, sedimentation, and centrifugation.

In some embodiments, the finer electrode materials in the suspension may be collected from the polar solvent by filtration. Suitable filtration methods include gravity filtration, pressure filtration, or vacuum filtration.

In certain embodiments, the delaminated water-based binder material may form a colloid which tends to form flocs. In this way, the holes of the sieve tend to quickly become clogged with the colloid. As a result, the sieve becomes partially or fully inoperable. To our surprise, the use of a buffer solution suppresses the formation of the colloid. Therefore, the time required for the relevant process can be shortened and the screening efficiency has been improved.

The recycling method disclosed herein involves an aqueous-based recycling technology. A high-temperature or strong-acid environment is not necessary and the aqueous processes are particularly environmentally friendly. Furthermore, the method disclosed herein is simple and can be easily scaled up and operated at low cost.

The following examples are presented to exemplify embodiments of the invention but are not intended to limit the invention to the specific embodiments set forth. Unless indicated to the contrary, all parts and percentages are by weight. All numerical values are approximate. When numerical ranges are given, it should be understood that embodiments outside the stated ranges may still fall within the scope of the invention. Specific details described in each example should not be construed as necessary features of the invention.

EXAMPLES

Example 1

Assembling of Pouch-Type Full Lithium-Ion Batteries

Preparation of Positive Electrodes

The positive electrodes were prepared by mixing 94 wt. % cathode material (LNMC TLM 310, obtained from Xinxiang Tianli Energy Co. Ltd., China), 3 wt. % carbon black (SuperP; obtained from Timcal Ltd, Bodio, Switzerland) as a conductive agent, and 3 wt. % polyacrylonitrile (LA 132, Chengdu Indigo Power Sources Co., Ltd., China) as a binder, which were dispersed in deionized water to form a slurry with a solid content of 50 wt. %. The slurry was then uniformly spread onto aluminum foil as a current collector using a doctor blade coater (obtained from Shenzhen KejingStar Technology Ltd., China; model no. MSK-AFA-III) and dried at 50° C. for 12 hours to obtain a cathode aluminum film.

Preparation of Negative Electrodes

The negative electrodes were prepared by mixing 90 wt. % of hard carbon (HC; purity of 99.5%, obtained from Ruifute Technology Ltd., Shenzhen, Guangdong, China) with 5 wt. % polyacrylonitrile as a binder and 5 wt. % carbon black as a conductive agent, which were dispersed in deionized water to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 8 cm×12 cm. Pouch-type batteries were prepared by stacking the cathode and anode sheets in an alternating manner and separated by porous polyethylene separators (Celgard, LLC, US) having a thickness of 25 μm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

Used lithium-ion batteries (0.5 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into deionized water (5 L) at 20° C. to form a heterogeneous mixture. The mixture was stirred mechanically for 1 hour at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising water and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 90%.

Example 2

Assembling of Pouch-Type Full Lithium-Ion Batteries

Pouch-type lithium-ion batteries were prepared by the method described in Example 1. The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

Used lithium-ion batteries (~20 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into deionized water (25 L) at 20° C. to form a heterogeneous mixture. The mixture was agitated by an ultrasonic probe (NP2500; obtained from Guangzhou Newpower Ultrasonic Electronic Equipment Co., Ltd., China) with an input power of 200 W for 2 hours at 20° C. The cathode material was detached from the aluminum foil, while the anode material fell off the copper foil. After ultrasonic processing, the structural part, copper foil and aluminum foil were removed by passing through a sieve having a mesh width of 4 mm to give a suspension comprising water and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 63%.

Example 3

Assembling of Pouch-Type Full Lithium-Ion Batteries

Pouch-type lithium-ion batteries were prepared by the method described in Example 1. The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 800 cycles.

Recycling of Batteries

Used lithium-ion batteries (~20 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into deionized water (25 L) at 20° C. to form a heterogeneous mixture. The mixture was stirred mechanically for 2 hour at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising water and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 93%.

Example 4

Assembling of Pouch-Type Full Lithium-Ion Batteries

Preparation of Positive Electrodes

The positive electrodes were prepared by mixing 92 wt. % cathode material ($LiMn_2O_4$ obtained from HuaGuan HengYuan LiTech Co. Ltd., Qingdao, China), 3 wt. % carbon black (SuperP; obtained from Timcal Ltd, Bodio, Switzerland) as a conductive agent, and 1 wt. % carboxymethyl cellulose (CMC, BSH-12, DKS Co. Ltd., Japan), 3 wt. % styrene butadiene rubber (SBR) (AL-2001, NIPPON A&L INC., Japan) and 2 wt. % polyvinylidene fluoride (PVDF; Solef® 5130, obtained from Solvay S.A., Belgium) as a binder, which were dispersed in N-methyl-2-pyrrolidone (NMP; purity of ≥99%, Sigma-Aldrich, USA) to form a slurry with a solid content of 50 wt. %. The slurry was then uniformly spread onto aluminum foil as a current collector using a doctor blade coater and dried at 50° C. for 12 hours to obtain a cathode aluminum film.

Preparation of Negative Electrodes

The negative electrodes were prepared by mixing 90 wt. % of hard carbon (HC; purity of 99.5%, obtained from Ruifute Technology Ltd., Shenzhen, Guangdong, China) with 1.5 wt. % CMC (BSH-12, DKS Co. Ltd., Japan) and 3.5 wt. % SBR (AL-2001, NIPPON A&L INC., Japan) as a binder and 5 wt. % carbon black as a conductive agent, which were dispersed in deionized water to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 8 cm×12 cm. Pouch-type batteries were prepared by stacking the cathode and anode sheets in an alternating manner and separated by porous polyethylene separators (Celgard, LLC, US) having a thickness of 25 μm. The electrolyte was a solution of LiPF6 (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.3 V to mimic the real-life usage patterns. The actual cell capacity was about 4.2 Ah. The nominal capacity fell below 80% of its initial rated capacity after 1000 cycles.

Recycling of Batteries

Used lithium-ion batteries (0.5 kg) were fully discharged by soaking in 4% NaCl solution for 12 hours. After discharging, the lithium-ion batteries were chopped into pieces by a battery cutting machine (Kaidi Machinery, Zhengzhou, China). The pieces of the chopped lithium-ion batteries, having an average length from about 1 inches to about 1.5 inches were immersed into deionized water (10 L) at room temperature to form a heterogeneous mixture. The mixture was agitated ultrasonically at room temperature for 0.5 hour. The cathode material was detached from the aluminum foil, while the anode material fell off the copper foil. After stirring, the structural part, copper foil and aluminum foil were removed by passing through a sieve having a mesh width of 2 mm to give a suspension comprising water and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 93%.

Example 5

Assembling of Pouch-Type Full Lithium-Ion Batteries

Preparation of Positive Electrodes

The positive electrodes were prepared by mixing 94 wt. % cathode material $LiCoO_2$ (obtained from Xiamen Tungsten Co. Ltd., China), 3 wt. % carbon black (SuperP; obtained from Timcal Ltd, Bodio, Switzerland) as a conductive agent, and 3 wt. % polyacrylic acid (PAA, #181285, obtained from Sigma-Aldrich, US) as a binder, which were dispersed in deionized water to form a slurry with a solid content of 50 wt. %. The slurry was then uniformly spread onto aluminum foil as a current collector using a doctor blade coater and dried at 50° C. for 12 hours to obtain a cathode aluminum film.

Preparation of Negative Electrodes

The negative electrodes were prepared by mixing 90 wt. % of hard carbon (HC; purity of 99.5%, obtained from Ruifute Technology Ltd., Shenzhen, Guangdong, China) with 1.5 wt. % CMC (BSH-12, DKS Co. Ltd., Japan) and 3.5 wt. % SBR (AL-2001, NIPPON A&L INC., Japan) as a binder and 5 wt. % carbon black as a conductive agent, which were dispersed in deionized water to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 8 cm×12 cm. Pouch-type batteries were prepared by stacking the cathode and anode sheets in an alternating manner and separated by porous polyethylene separators (Celgard, LLC, US) having a thickness of 25 μm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.3 V to mimic the real-life usage patterns. The actual cell capacity was about 5.2 Ah. The nominal capacity fell below 80% of its initial rated capacity after 650 cycles.

Recycling of Batteries

Used lithium-ion batteries (0.5 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into deionized water (5 L) at 20° C. to form a heterogeneous mixture. The mixture was stirred mechanically for 2 hours at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising water and electrode materials. After removal of the structural part, copper foil and aluminum foil, the suspension was filtered to obtain the electrode materials. The recovered electrode materials were dried in an oven for 5 hours at 70° C. under atmospheric pressure and obtained in a yield of 90%.

Example 6

Assembling of Pouch-Type Full Lithium-Ion Batteries

Pouch-type lithium-ion batteries were prepared by the method described in Example 5. The assembled pouch-type batteries were then subjected to repeated charge and discharge cycles at a constant current rate of 1 C between 3.0 V and 4.2 V to mimic the real-life usage patterns. The actual cell capacity was about 5 Ah. The nominal capacity fell below 80% of its initial rated capacity after 700 cycles.

Recycling of Batteries

Used lithium-ion batteries (0.5 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium--ion batteries, having an average length from about 0.5 inches to about 1.0 inches were immersed into a 0.05 M phosphate buffer solution (5 L) having a pH value of about pH 6.8 at 20° C. to form a heterogeneous mixture. The phosphate buffer solution was prepared by dissolving 39 g of sodium phosphate monobasic dihydrate ($NaH_2PO_4.2H_2O$, obtained from Sigma-Aldrich, US) in deionized water (5 L). The mixture was stirred mechanically for 2 hours at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising the buffer solution and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 95%.

Example 7

Assembling of Pouch-Type Full Lithium-Ion Batteries

Preparation of Positive Electrodes

The positive electrodes were prepared by mixing 91 wt. % cathode material $LiFePO_4$ (obtained from Xiamen Tungsten Co. Ltd., China), 5 wt. % carbon black (SuperP; obtained from Timcal Ltd, Bodio, Switzerland) as a conductive agent, and 4 wt. % sodium alginate (SA, #180947, obtained from Sigma-Aldrich, US) as a binder, which were dispersed in deionized water to form a slurry with a solid content of 50 wt. %. The slurry was then uniformly spread onto aluminum foil as a current collector using a doctor blade coater and dried at 50° C. for 12 hours to obtain a cathode aluminum film.

Preparation of Negative Electrodes

The negative electrodes were prepared by mixing 90 wt. % of hard carbon (HC; purity of 99.5%, obtained from Ruifute Technology Ltd., Shenzhen, Guangdong, China) with 1.5 wt. % CMC (BSH-12, DKS Co. Ltd., Japan) and 3.5 wt. % SBR (AL-2001, NIPPON A&L INC., Japan) as a binder and 5 wt. % carbon black as a conductive agent, which were dispersed in deionized water to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 8 cm×12 cm. Pouch-type batteries were prepared by stacking the cathode and anode sheets in an alternating manner and separated by porous polyethylene separators (Celgard, LLC, US) having a thickness of 25 μm. The electrolyte was a solution of $LiPF_6$ (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 2.5 V and 3.6 V to mimic the real-life usage patterns. The actual cell capacity was about 4 Ah. The nominal capacity fell below 80% of its initial rated capacity after 500 cycles.

Recycling of Batteries

Used lithium-ion batteries (0.5 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into a mixture of deionized water (6.5 L) and ethanol (1.5 L) at 20° C. to form a heterogeneous mixture. The mixture was stirred mechanically for 1 hour at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising water and ethanol and electrode materials. After removal of the structural part, copper foil and aluminum foil, the suspension was filtered to obtain the electrode materials. The recovered electrode materials were dried in an oven for 5 hours at 80° C. under atmospheric pressure and obtained in a yield of 91%.

Example 8

Assembling of Pouch-Type Full Lithium-Ion Batteries

Preparation of Positive Electrodes

The positive electrodes were prepared by mixing 94 wt. % cathode material $LiNi_{0.33}Mn_{0.33}Co_{0.33}O_2$ (obtained from Shenzhen Tianjiao Technology Co. Ltd., China), 3 wt. % carbon black (SuperP; obtained from Timcal Ltd, Bodio, Switzerland) as a conductive agent, and 1.5 wt. % polyacrylic acid (PAA, #181285, obtained from Sigma-Aldrich, US) and 1.5 wt. % polyacrylonitrile (LA 132, Chengdu Indigo Power Sources Co., Ltd., China) as a binder, which were dispersed in deionized water to form a slurry with a solid content of 50 wt. %. The slurry was then uniformly spread onto aluminum foil as a current collector using a doctor blade coater and dried at 50° C. for 12 hours to obtain a cathode aluminum film.

Preparation of Negative Electrodes

The negative electrodes were prepared by mixing 90 wt. % of hard carbon (HC; purity of 99.5%, obtained from Ruifute Technology Ltd., China) with 1.5 wt. % CMC (BSH-12, DKS Co. Ltd., Japan) and 3.5 wt. % SBR (AL- 2001, NIPPON A&L INC., Japan) as a binder, and 5 wt. % carbon black as a conductive agent, which were dispersed in deionized water to form another slurry with a solid content of 50 wt. %. The slurry was then uniformly spread onto copper foil as a current collector using a doctor blade coater and dried at 50° C. for 12 hours to obtain an anode copper film.

Assembling of Pouch-Type Batteries

After drying, the resulting cathode film and anode film were used to prepare the cathode sheet and anode sheet respectively by cutting into pieces of square shape in the size of 8 cm×12 cm. Pouch-type batteries were prepared by stacking the cathode and anode sheets in an alternating manner and separated by porous polyethylene separators (Celgard, LLC, US) having a thickness of 25 μm. The electrolyte was a solution of LiPF6 (1 M) in a mixture of ethylene carbonate (EC), ethyl methyl carbonate (EMC) and dimethyl carbonate (DMC) in a volume ratio of 1:1:1. The cells were assembled in high-purity argon atmosphere with moisture and oxygen content <1 ppm. After electrolyte filling, the pouch cells were vacuum sealed and then mechanically pressed using a punch tooling with standard shape.

The assembled pouch-type batteries were then subjected to repeated charge and discharge cycles at a constant current rate of 1 C between 3.0 V and 4.2 V to mimic the real-life usage patterns. The actual cell capacity was about 5.1 Ah. The nominal capacity fell below 80% of its initial rated capacity after 900 cycles.

Recycling of Batteries

Used lithium-ion batteries (0.5 kg) were fully discharged by soaking in 6% NaCl solution for 12 hours. After discharging, the lithium-ion batteries were chopped into pieces by a water jet cutting machine (YCWJ-3038-L2015-1D, YC Industry Co., Ltd., Jiangsu, China). The pieces of the chopped lithium-ion batteries, having an average length from about 0.5 inches to about 1.0 inches were immersed into a mixture of deionized water (5 L) and acetone (1 L) at 20° C. to form a heterogeneous mixture. The mixture was stirred mechanically for 1 hour at 20° C. The cathode material was detached from the aluminum foil, while the anode material fell off the copper foil. After stirring, the structural part, copper foil and aluminum foil were removed by passing through a sieve having a mesh width of 4 mm to give a suspension comprising water and acetone and electrode materials. After removal of the structural part, copper foil and aluminum foil, the suspension was filtered to obtain the electrode materials. The recovered electrode materials were dried in an oven for 5 hours at 75° C. under atmospheric pressure and obtained in a yield of 92%.

While the invention has been described with respect to a limited number of embodiments, the specific features of one embodiment should not be attributed to other embodiments of the invention. In some embodiments, the methods may include numerous steps not mentioned herein. In other embodiments, the methods do not include, or are substantially free of, any steps not enumerated herein. Variations and modifications from the described embodiments exist. The appended claims intend to cover all those modifications and variations as falling within the scope of the invention.

What is claimed is:

1. A method for recycling lithium-ion batteries, comprising the steps of:
   a) discharging the lithium-ion batteries;
   b) chopping the lithium-ion batteries into pieces to provide a mixture of a structural part, a first conductive metal part coated with a cathode layer, and a second conductive metal part coated with an anode layer;
   c) immersing the pieces of the choppedlithium-ion batteries into a polar solvent to form a heterogeneous mixture;
   d) processing the heterogeneous mixture with mechanical agitation for a time period from about 15 minutes to about 2 hours to dissolve a binder material;
   e) screening the processed heterogeneous mixture to separate the structural part, first conductive metal part, and second conductive metal part from finer electrode materials comprising cathode and anode materials to provide a suspension comprising the polar solvent and the finer electrode materials; and
   f) isolating the finer electrode materials in the suspension from the polar solvent,
   wherein the polar solvent is a buffer solution having a pH from about 6 to about 8.

2. The method of claim 1, wherein step d) is performed at room temperature.

3. The method of claim 1, wherein the heterogeneous mixture in step d) is heated at a temperature from about 35° C. to about 100° C., or from about 55° C. to about 75° C.

4. The method of claim 1, wherein the binder material comprises a water-based binder material selected from the group consisting of unsaturated polymer, conjugated diene polymer, styrene-butadiene rubber, acrylated styrene-butadiene rubber, acrylonitrile-butadiene rubber, acryl rubber, butyl rubber, fluorine rubber, polyvinylpyrrolidone, polyolefin, polyethylene, polypropylene, ethylene/propylene copolymers, polybutadiene, polyethylene oxide, chlorosulfonated polyethylene, polyvinylpyrrolidone, polyvinylpyridine, polyvinyl compound, polyvinyl alcohol, polyvinyl acetate, polyepichlorohydrin, polyphosphazene, polyacrylonitrile, polystyrene, latex, acrylic resins, phenolic resins, epoxy resins, cellulose, carboxymethyl cellulose, hydroxypropyl cellulose, cellulose acetate, cellulose acetate butyrate, cellulose acetate propionate, cyanoethylcellulose, cyanoethylsucrose, polyester, polyamide, polyether, polyimide, polycarboxylate, polycarboxylic acid, polyacrylic acid, polyacrylate, polymethacrylic acid, polymethacrylate, polyacrylamide, polyurethane, halogenated polymer, fluorinated polymer, chlorinated polymer, a salt of alginic acid, and combinations thereof.

5. The method of claim 4, wherein the salt of alginic acid comprises a cation selected from Na, Li, K, Ca, NH$_4$, Mg, Al, or a combination thereof.

6. The method of claim 1, wherein the binder material comprises a water-based binder that is a monomer containing a carboxylic acid group, a sulfonic acid group, or a combination thereof.

7. The method of claim 1, wherein the lithium-ion batteries are chopped by a water jet cutting machine or a cutting device with teeth or blades.

8. The method of claim 1, wherein the pieces of the chopped lithium-ion batteries have an average length from about 0.5 inches to about 4.0 inches.

9. The method of claim 1, wherein the pieces of the chopped lithium-ion batteries have an average length of about one quarter inch or less.

10. The method of claim 1, wherein each of the first and second conductive metal parts is independently selected from the group consisting of an aluminum thin plate, a copper thin plate, a gold thin plate, a silver thin plate, and a platinum thin plate.

11. The method of claim 1, wherein the buffer solution comprises a salt selected from the group consisting of lithium carbonate, lithium bicarbonate, lithium phosphate, sodium carbonate, sodium bicarbonate, sodium phosphate, potassium carbonate, potassium bicarbonate, potassium phosphate, ammonium carbonate, ammonium bicarbonate, ammonium phosphate, and combinations thereof.

12. The method of claim 1, wherein the mechanical agitation of the processing step is performed by stirring, shaking, ultrasonication, vortexing, or a combination thereof.

13. The method of claim 1, wherein the binder material further comprises an organic-based binder material.

14. The method of claim 13, wherein the organic-based binder material is selected from the group consisting of polytetrafluoroethylene, perfluoroalkoxy polymer, polyvinylidene fluoride, copolymer of tetrafluoroethylene and hexafluoropropylene, fluorinated ethylene-propylene copolymer, terpolymer of tetrafluoroethylene, hexafluoropropylene and vinylidene fluoride, and combinations thereof.

15. The method of claim 1, wherein the finer electrode materials further comprise a conductive agent.

16. The method of claim 1, wherein the cathode material is a lithium metal oxide selected from the group consisting of $LiNiO_2$, $LiNi_xMn_yO_2$, $Li_{1+z}Ni_xMn_yCo_{1-x-y}O_2$, $LiNi_xCo_yAl_zO_2$, $LiV_2O_5$, $LiTiS_2$, $LiMoS_2$, $LiMnO_2$, $LiCoO_2$, $LiCrO_2$, $LiMn_2O_4$, $LiFePO_4$, and combinations thereof, wherein each x is independently from 0.3 to 0.8; each y is independently from 0.1 to 0.45; and each z is independently from 0 to 0.2; and wherein the anode material is a carbonaceous material.

17. The method of claim 1, wherein the finer electrode materials are screened by passing through a sieve having a mesh width between 2 mm and 4 mm, or between 0.5 mm and 1.0 mm.

18. The method of claim 1, wherein isolation of the finer electrode materials is performed by filtration, decanting, settling, centrifugation, or a combination thereof.

* * * * *